Jan. 5, 1926.
H. VARDER
1,568,643
TIRE CHAIN TOOL
Filed Jan. 24, 1925
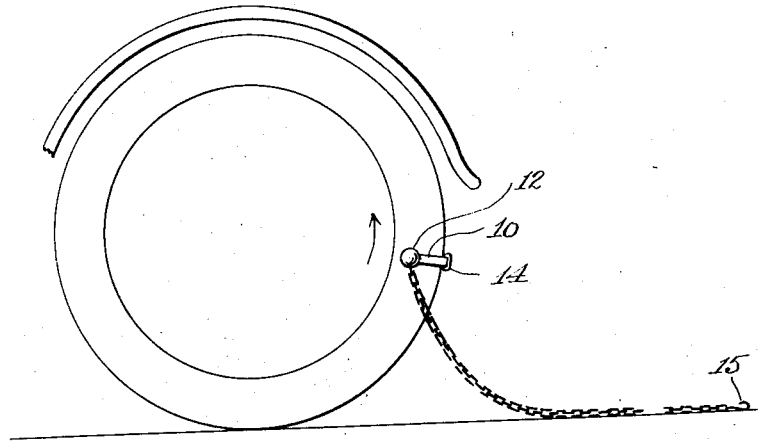
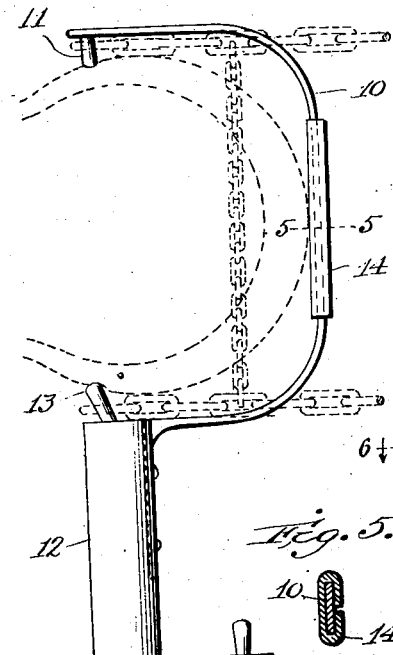
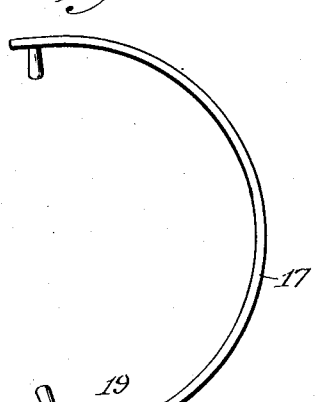
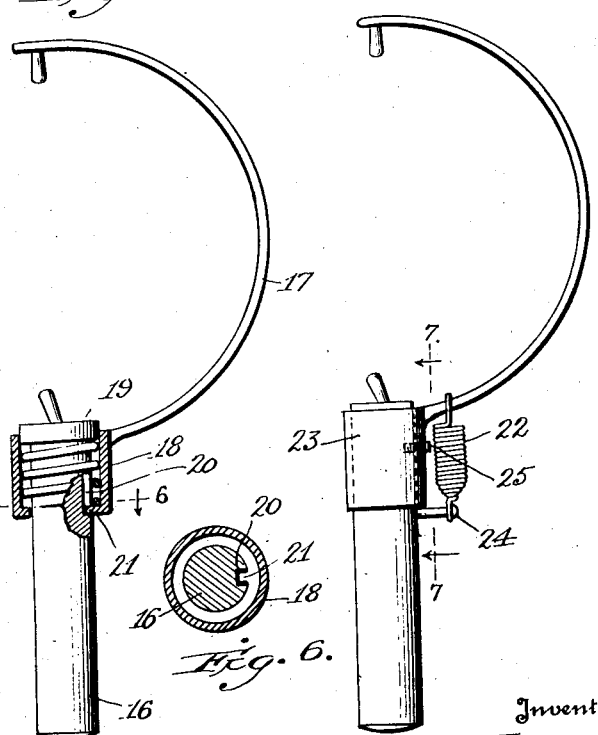
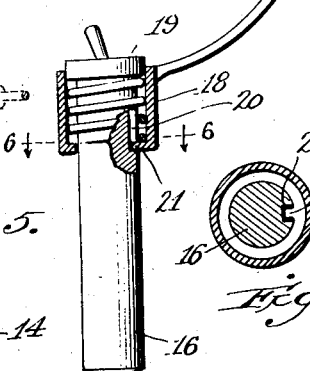
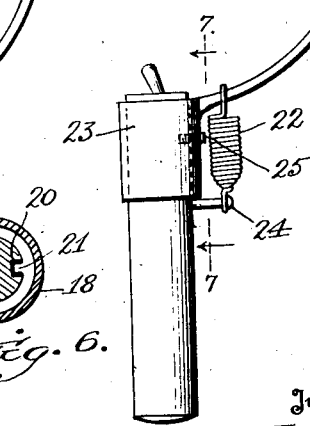
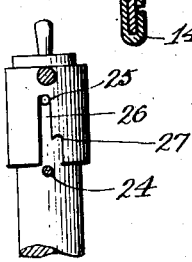
Inventor
Holger Varder
By Edwin L. Jewell
his Attorney Patented Jan. 5, 1926.

1,568,643

UNITED STATES PATENT OFFICE.

HOLGER VARDER, OF NEW YORK, N. Y.

TIRE-CHAIN TOOL.

Application filed January 24, 1925. Serial No. 4,632.

*To all whom it may concern:*

Be it known that I, HOLGER VARDER, a citizen of the United States, residing at New York city, in the county of Bronx and State of New York, have invented certain new and useful Improvements in Tire-Chain Tools, of which the following is a specification.

This invention relates to improvements in tire-chain tools and has for its objects to provide a device which is simple in construction and operation, and also a tool that will be convenient for use by automobile drivers in applying the anti-skid chains when required.

These and other objects hereinafter set forth are attained by the means illustrated in the accompanying drawing, in which:—

Figure 1 is a diagrammatic side elevation of an automobile tire or wheel showing the improved tool attached thereto in the initial position of applying a tire-chain on the tire.

Figure 2 is a side elevation of the preferred form of tool showing a portion of the tire and tire-chain in dotted lines.

Figure 3 is a similar view showing a slightly modified form of tool.

Figure 4 is a like view showing a further modified form of tool, and Figures 5, 6 and 7 are detail sectional views on the lines 5—5 of Figure 2, and 6—6 of Figure 3, and 7—7 of Figure 4, respectively.

Similar reference numerals in all of the figures of the drawing designate like parts.

Referring to Figures 1, 2 and 5, (which show the preferred form of tool,) 10 designates a bowed body-member or strap adapted to reach around the tire from one side thereof to the other and is preferably formed of spring metal to enable it to be expanded to receive the tire. At one end of this member 10 is provided an inwardly projecting supporting-pin 11, and the other end of member 10 is provided with a rigid handle 12 from the inner end of which projects a supporting-pin 13 which preferably inclines inwardly in a direction away from the bowed portion for a purpose hereinafter set forth. The handle 12 is of substantial proportions to enable it to be grasped by the hand of the user, so that the user can readily support the tool while the free end of the tire-chain is attached thereto.

Both of the supporting-pins 11 and 13 are preferably tapered inwardly toward their bases or points of attachment to the handle 12 or the free end of the bowed body-portion, said tapering having a tendency of sliding the end chain-links of the tire-chain, which are engaged around the supporting-pins, toward the supports for the pins and thus serve to retain the end-links in position while the tool is being used in connection with the tire-chain.

Preferably, the bowed portion is flattened intermediate its ends, and around this flattened portion is secured a metal reinforcement 14 for retaining the perfect shape of the spring bowed-portion at this point, as otherwise, if not reinforced, the spring would get a permanent deformation when a heavy wheel rides over it.

In use, the supporting-pins 11 and 13 are engaged in a pair of opposite links in the side chains of a tire-chain while holding the tool by the handle 12. The tool is then pressed upon the tire while having the end of the tire chain attached thereto and due to the elasticity or resiliency of the bowed-portion it snaps into position beyond the point of its greatest diameter, and the rounded ends of the supporting-pins 11 and 13 engage the opposite sides of the tire and slightly indent the rubber at those points which prevents the tool from slipping on the tire when supporting the weight of that portion of the chain between the tool and the ground, and also effectually prevents slipping due to the pull caused by the drag of the chain on the ground. After the tool having the chain secured thereto is attached as shown in Figure 1 of the drawing, the wheel is rotated in the direction of the arrow and the chain is wound around the tire in the usual manner, and after fully wound thereon, the end hooks 15, (Figure 1) are secured to the ends of the chain at the tool engaging end, thus securing the chain on the tire. Then the tool is removed by grasping the handle 12 and pulling slightly backwards, which movement readily removes the pin 13 from its link of the chain due to its inclination, and after the pin is removed, it is an easy matter to remove the opposite pin 11.

In the modified form shown in Figures 3 and 6, the handle 16 is shown diametrically adjustable with respect to the bowed body-portion 17, said body-portion 17 having a spring casing 18 at one end, and the inner end of the handle being provided with a head 19 adapted to slide in said casing 18, said head being normally projected inwardly by a spring in the casing and surrounding a portion of the handle. To prevent rotation of the handle with respect to the casing and bowed portion a groove 20 is formed in one side of the handle and is engaged by a lug 21 projecting from the casing. The end of the groove 20 forms a stop to limit the inward movement of the head. In this form, the adjustability of the inclined pin permits an easy application of the tool to the tire.

In the form shown in Figure 4 the handle and its inclined pin are also adjustable inwardly and outwardly in a similar manner to the Figure 3 form, the difference in construction being, that the handle-spring 22 is located outside of the casing 23 and is attached between a stop-pin 24 and the bowed-portion. The handle in this form is prevented from turning or rotating by a guide-pin 25 fixed in the handle and projecting through a slot 26 in one side of the casing 23, (see Figure 7).

To lock the handle in its out position temporarily, the groove 26 is formed with an intermediate shoulder 27 which can be engaged by the pin 25. It is understood that a similar intermediate shoulder can be used in the Figure 3 construction, if desired.

Having thus fully described the invention, what is claimed is:—

1. In a tire-chain tool, a bowed body-portion having an outwardly projecting handle at one end of said bowed body-portion, said handle being of substantial dimensions to enable it to be grasped by the hand of the user to support the tool and chain attached thereto, and chain supporting-pins projecting inwardly from opposite sides of the tool.

2. In a tire-chain tool, a bowed body-portion having an outwardly projecting handle at one end of said bowed body-portion, said handle being of substantial dimensions to enable it to be grasped by the hand of the user to support the tool and chain attached thereto, and chain supporting-pins projecting inwardly from opposite sides of the tool, said chain-supporting pins being tapered toward their bases.

3. In a tire-chain tool, a bowed body-portion having an outwardly projecting handle at one end of said bowed body-portion, said handle being of substantial dimensions to enable it to be grasped by the hand of the user to support the tool and chain attached thereto, and chain supporting-pins projecting inwardly from opposite sides of the tool, one of said chain-supporting pins being inclined in a direction from the bowed body-portion.

4. In a tire-chain tool, a bowed body-portion having an outwardly projecting handle at one end of said bowed body-portion, said handle being of substantial dimensions to enable it to be grasped by the hand of the user to support the tool and chain attached thereto, and chain supporting-pins projecting inwardly from opposite sides of the tool and adjustable with respect to each other to widen the space between the ends thereof.

In testimony whereof I affix my signature.

HOLGER VARDER.